July 11, 1933.  F. G. HEHR  1,917,941
TUBE FOR CONDUCTING LIQUIDS
Filed Feb. 1, 1929
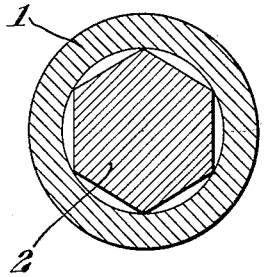
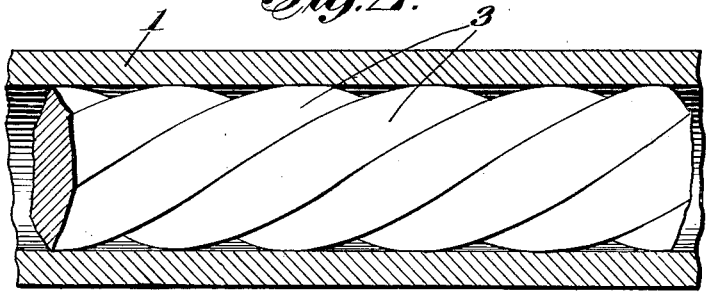
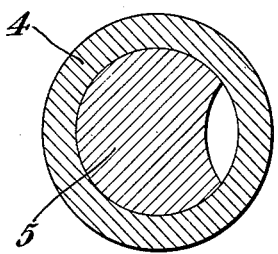
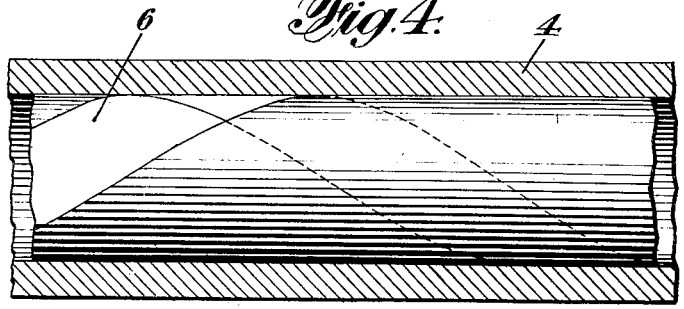
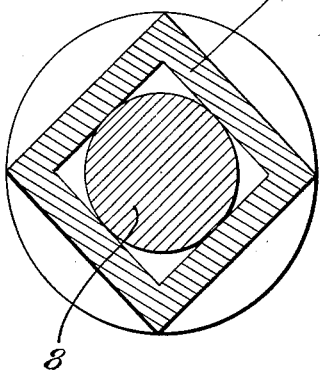
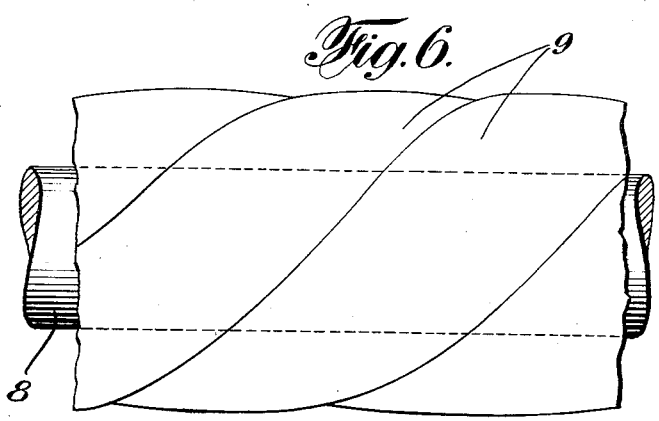
INVENTOR
Frederick G. Hehr
BY
Townsend & Decker
ATTORNEYS Patented July 11, 1933

1,917,941

UNITED STATES PATENT OFFICE

FREDERICK G. HEHR, OF NEW YORK, N. Y., ASSIGNOR, BY DIRECT AND MESNE ASSIGNMENTS, TO AEROL ENGINE CORPORATION, OF NEW YORK, N. Y., A CORPORATION OF NEW YORK

TUBE FOR CONDUCTING LIQUIDS

Application filed February 1, 1929. Serial No. 336,789.

This invention has for its principal object the production of a conduit or tubing for conducting liquids therethrough and so constructed as to prevent the formation of airlocks therein when the liquid is flowing or is forced therethrough.

In certain types of machines or engines it is absolutely necessary that oil or fuel be fed from one location to another without collecting in bends to form airlocks in order that the machinery or engine shall function effectively and satisfactorily. This is especially true in injection lines of solid injection Diesel engines to which the invention is peculiarly applicable.

The invention consists in the novel conduit hereinafter more particularly described and then specified in the claim.

In the accompaying drawing illustrating a practical embodiment of the invention:

Fig. 1 is a cross section taken through the conduit shown in Fig. 2.

Fig. 2 is a horizontal section taken through the conduit.

Figs. 3 and 4 are views similar to Figs. 1 and 2 respectively but showing a modification.

Figs. 5 and 6 are views similar to Figs. 1 and 2 and showing in section and elevation, respectively, a further modification.

Referring in detail to the drawing:

A section of a fuel injection pipe is indicated at 1. This pipe is of uniform construction from the compressor or ejection device (not shown) to the point of discharge into the combustion chamber of the self igniting internal combustion engine. In order to break up any eddy streams and give the fuel a high velocity, sufficient to break up any air bubbles into fine particles and to prevent such air from collecting in the corners or elsewhere in the pipe, the interior of the pipe 1 is provided with an inner member 2 which occupies the major portion of the interior of the pipe 1. The member 2 constructed as shown in Figs. 1 and 2 is formed from a solid hexagonal bar twisted to form spiral passageways having a relatively shallow pitch. The inner member 2 so formed is fitted snugly within the interior of the pipe 1 so that the points of the inner bar engage the interior surface of the pipe for the entire length of the pipe. The result is a plurality of small smooth-walled tortuous fuel passages which give to the fluid passing through the same a high velocity. Any air bubbles therein are broken up into fine particles and readily absorbed and carried away in the fuel stream.

In the modification illustrated in Figs. 3 and 4 the outer tube or pipe is indicated at 4 and the inner solid member is indicated at 5. The configuration of the latter member conforms to that of the outer member 4 within which it is snugly received but the inner member is formed with a single spiral passageway 6.

In the modification of Figs. 5 and 6 the outer member 7 is formed with a plurality of angled sides, it being rectangular in the specific embodiment shown. The inner solid member 8 is round and fits snugly within the outer member. In this case the outer rectangular member has been twisted to form a plurality of spiral passageways 9.

The use of the above described devices will be readily understood. The tubing extending from the fuel injector to the point of intake in the engine is divided into small uniform spiral passages which give the fuel a high velocity. The result is that any air bubbles in the fuel passageways are broken up and carried away with the fuel stream. This result is accomplished without materially decreasing the flow of fuel since the passages are smooth and substantially uniform in cross-section from one end of the tube to the other.

What I claim as my invention is:

In a conduit for conducting fuel from a fuel injector to a combustion chamber, an outer tubular member having a substantially smooth longitudinal bore, an inner filling member formed as a twisted multisided bar to form alternate spiral projecting edges and intervening smooth portions thereon, the twist of said member having a relatively shallow pitch, said inner member contacting through its projecting edges with the interior of said outer member to form restricted enclosed spiral passageways extending uniformly throughout the entire length of said conduit.

Signed at New York, in the county of New York and State of New York, this 31st day of January, A. D. 1929.

FREDERICK G. HEHR.